April 9, 1963 P. C. THONEMANN ETAL 3,085,189
ENERGY-TRANSFER SYSTEMS
Original Filed Aug. 10, 1951 2 Sheets-Sheet 1
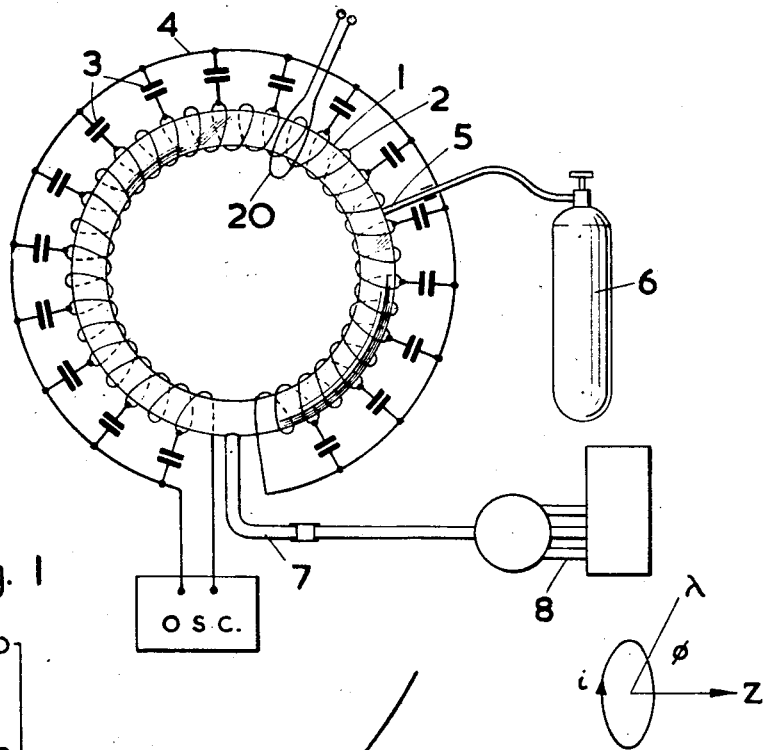
Fig. 1
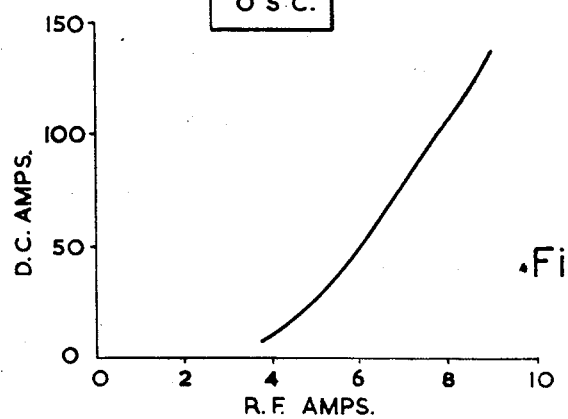
Fig. 2
Fig. 4
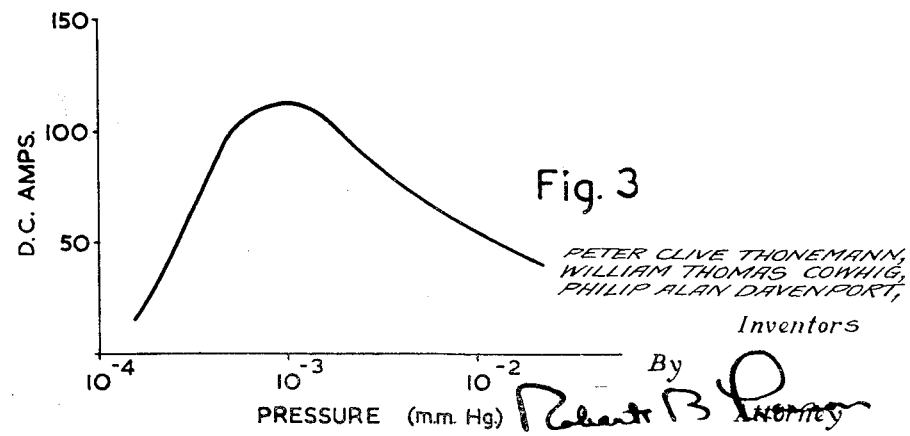
Fig. 3
PETER CLIVE THONEMANN,
WILLIAM THOMAS COWHIG,
PHILIP ALAN DAVENPORT,
Inventors
By Robert B. ...

April 9, 1963   P. C. THONEMANN ETAL   3,085,189
ENERGY-TRANSFER SYSTEMS
Original Filed Aug. 10, 1951   2 Sheets-Sheet 2

Inventors
PETER CLIVE THONEMANN,
WILLIAM THOMAS COWHIG,
PHILIP ALAN DAVENPORT
By
Robert B. ___ Attorney

United States Patent Office 3,085,189
Patented Apr. 9, 1963

3,085,189
ENERGY-TRANSFER SYSTEMS
Peter Clive Thonemann, William Thomas Cowhig, and Philip Alan Davenport, Oxford, England, assignors, by mesne assignments, to the United States of America as represented by the United States Atomic Energy Commission
Original application Aug. 10, 1951, Ser. No. 241,224. Divided and this application June 30, 1958, Ser. No. 750,059
3 Claims. (Cl. 321—32)

This invention relates to electro-magnetic induction devices, and processes for the transfer, transformation or conversion of energy.

The invention is based on the phenomenon that the progressive magnetic field of a travelling wave (for example the travelling wave produced in a loaded transmission line or by spaced coils excited in different phases) exerts a unidirectional drag upon electrons in the field and that conversely a unidirectional motion of electrons tends to produce or enhance a travelling wave.

It will be realised with Lenz's law in mind, that the electron motion tends to be equal and opposite to the electron motion which gives rise to the travelling wave, that is, the motion is a rotational one about the lines of magnetic force with a longitudinal drift superposed. Work is done in producing a net acceleration of the electrons, and consequently there is introduced a substantial resistive component into the network.

The drag may be utilised for the acceleration of electrons in a vacuum discharge tube to result in a new form of linear accelerator.

Or it may be utilised for establishing a unidirectional current or voltage in a circuit comprising a relatively fixed longitudinal conductor or semi-conductor. In this case the exciting alternating current energy and a rectifying device results which yields a uniform or modulated output dependent on the exciting or input energy.

The converse effect in which a unidirectional motion of electrons tends to produce a travelling wave may be exploited in a number of ways corresponding to those above-mentioned.

Firstly, a high-energy electron-beam or a current flowing unidirectionally in a fixed conductor may be used to develop a travelling wave growing in intensity along a loaded transmission line. The resulting device is a high-frequency generator.

If a wave be injected into one end of the line, it is augmented as a result of the interaction of its field and the electron stream. Consequently broad-band high-frequency amplification can be achieved by passing through the line the wave to be amplified; also a wave injected into the line can be modulated by varying the intensity of the electron stream.

From the foregoing it will be seen that the invention resides in an energy transformer having a primary and a secondary inductively coupled, the primary comprising a system (e.g. a loaded transmission line or a multiphase winding) in which a travelling wave can be set up, the secondary comprising a conducting medium in which transverse eddy currents and longitudinal currents can be set up.

In a variant form of the invention the secondary comprises a longitudinally movable fluid in which transverse eddy currents can be induced.

A loaded transmission line for use as the primary of the energy transformer comprises a long solenoid having either a substantial uniformly distributed capacity to ground or a succession of capacitative connections to ground, the secondary extending axially within the solenoid.

In some forms of the invention, the secondary is in the form of a ring and the solenoid has a curved axis conforming to the ring.

Other forms of transmission line may however be adopted, for example an artificial line comprising $\kappa$ or $\tau$ sections of lumped impedances. Whatever the form of the line, it needs to be substantially non-reflective over the desired operating frequency range. This is achieved by means of matched terminations in well known manner.

However, the secondary needs to offer a resistive load, and in consequence the travelling wave, when arranged to deliver energy to the secondary, becomes attenuated in its progress and tends to die away before reaching the end of the line, in which case the nature of the termination is of little effect.

If the wave does not die out over the length of the transmission line but dissipates an appreciable remnant in a resistive termination, input power is wasted.

A polyphase power input to separate coils provides an alternative travelling wave system free from this particular kind of power wastage. The polyphase power may be of any frequency within a wide range. Since the wave velocity is a function of frequency, however, the system is applicable for operation at particular frequencies and not for wide frequency bands.

The coils for the polyphase power input may be distributed along a common straight or curved axis.

Embodiments of the invention will now be described with reference to the accompanying drawings in which:

FIG. 1 is a diagrammatic plan view of a ring discharge tube suitable as a demodulator of modulated high frequency waves.

FIGS. 2 and 3 are curves illustrating the characteristics of the device shown in FIG. 1.

FIG. 4 is a vector diagram explaining the principle of the invention.

Figure 5:
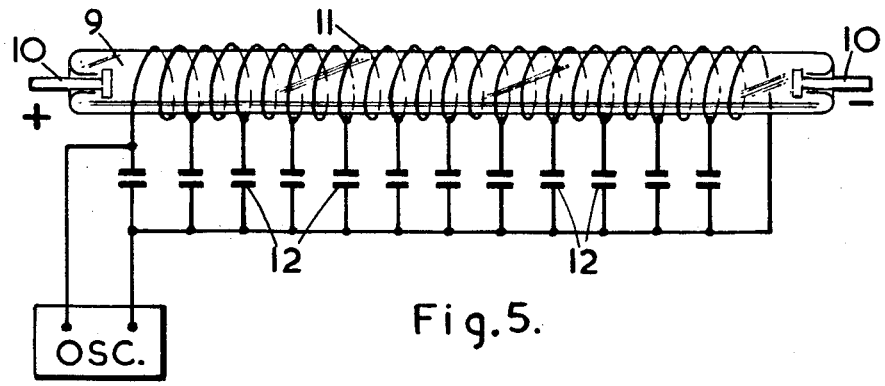
FIG. 5 is a side elevation of straight tube, the electrical connections and components being shown diagrammatically.

In the apparatus shown in FIG. 1 a hollow glass torus 1 of 18 cm. mean radius and 4 cm. tube diameter is provided with a close winding 2 of copper wire which is tapped every 12 turns and connected to 0.0011 micro-farad condensers 3 each connected at their other terminal to a return conductor 4. The arrangement constitutes a loaded transmission line which is shown connected at one end to a source OSC of R.F. power and short-circuited at the other. The circuit constants are such that the velocity of wave propagation is about $6 \times 10^7$ cm./sec., the oscillator frequency being about 1 megacycle/sec. at a power of 3 to 4 kw.

The torus is provided with a gas inlet port 5 which is connected to a gas cylinder 6. An outlet port 7 is also provided and communicates with a vacuum pump 8.

In one particular experiment, xenon gas was supplied to the torus, and the pump 8 operated at a rate to maintain an absolute pressure of $10^{-3}$ mm. (Hg) in the torus.

On applying the R.F. power to the line a luminous circulating D.C. discharge appears in the torus which is measured by means of a compass and compensating coil. FIG. 2 shows the D.C. current obtained for various R.F. input currents to the line at a frequency of 1.36 mc./s. The standing wave ratio in the line in the presence of the discharge is about 2:1 when the line is short-circuited and the voltage across the line decreases exponentially towards the short-circuit end. By means of a suitable terminating impedance this standing wave ratio can be reduced. The magnitude of the direct current is not sensitive to phase velocity or frequency but shows a wide change with gas pressure as indicated in FIG. 3.

The apparatus may therefore be used as a broad-band demodulator of H.F. signals applied to the line, the L.F. output being picked up by coil 20 linked with the torus or by a coil on an iron circuit linked with the torus.

The origin of the force which sets up the D.C. current is explained in relation to the cylindrical co-ordinates $r$, $\phi$ and $z$ shown in FIG. 4. The changing $z$ component of the magnetic field along the circular axis of the tube induces rings of electron currents $i$ circulating in the $\phi$ direction. These currents interact with the radial component of the magntic field and therefore experience a force in the $z$ direction, i.e. the direction of wave propagation. The D.C. current in the gas is therefore a series of transverse rings of current drifting along the circular axis of the torus.

If the electron currents are in phase with the electric field the force is always in the direction of wave propagation. If the electron currents are in quadrature with said field the net force over a cycle vanishes and the electron currents are not accelerated along the tube unless trapping takes place and the phase velocity of the wave is increased.

FIG. 5 shows a sealed glass tube 9, 5 cm. diameter and 60 cm. long, containing mercury vapour at about $10^{-3}$ mm. Hg pressure and provided at each end with heavy section sealed-in electrodes one of which is an electron emitting cathode. A helix 11 of closely wound copper wire on the tube 9 is loaded every 12 turns with 0.0011 microfarad condensers 12 so that the velocity of wave propagation of the loaded transmission line constituted by the helix 11 and condensers 12 is about $6 \times 10^7$ cm./sec. One end of the line is short-circuited and the other end is fed with R.F. power from a 1 megacycle oscillator OSC capable of delivering 3–4 kw. as in the case of the experimental torus.

The travelling wave tends to set up a drift of electrons in the tube and a potential difference of 4 to 5 volts increasing with increased R.F. power input appears across the electrode 2 and if electrons are supplied from the cathode a current may be taken from the electrodes. This current output varies with the H.F. input amplitude and therefore also this device serves as a demodulator or rectifier of modulated H.F. waves.

The above described embodiment of the invention may be operated in reverse to convert D.C. to A.C. by providing a cathode in the form of an electron gun and passing a stream of electrons through the tube, and by providing a feed back connection instead of short-circuiting one end of the transmission line. Initiated by random transverse movements of the electrons of the stream, a high frequency wave generated in the winding is built up by the feed-back action and can then be taken from the line as H.F. power. By modulating the electron stream the H.F. output is modulated. Also by feeding R.F. signals to one end of the line an amplified output can be obtained at the other end.

Figure 6:
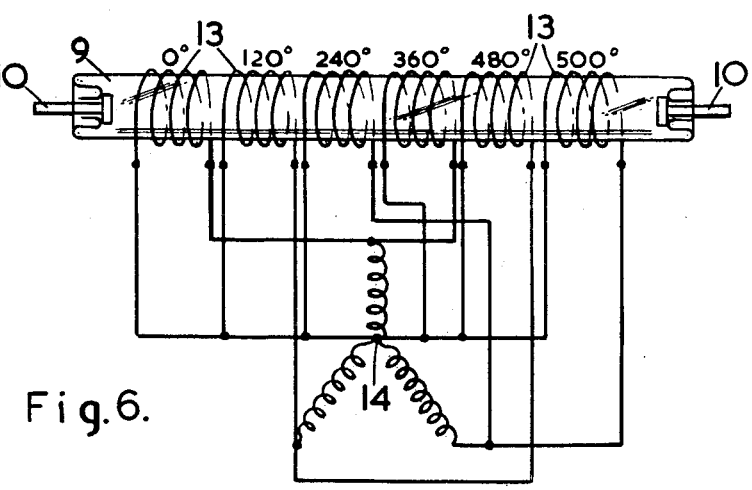
FIG. 6 is a view similar to FIG. 5 of a modification thereof.

FIG. 6 shows a modification of the apparatus shown in FIG. 5. Instead of a loaded transmission line, a plurality of windings 13 on the tube 9 are connected to a source 14 of polyphase R.F. power. As shown the source 14 is three phase and is arranged to feed six windings 15 at phase displacements of 120°. The arrangement may also be operated as a converter as described with reference to FIG. 5. It will be appreciated that the devices of FIGS. 5 or 6, being provided with an electron emitting cathode, may be operated as high vacuum tubes or as gas filled tubes.

Figure 7:
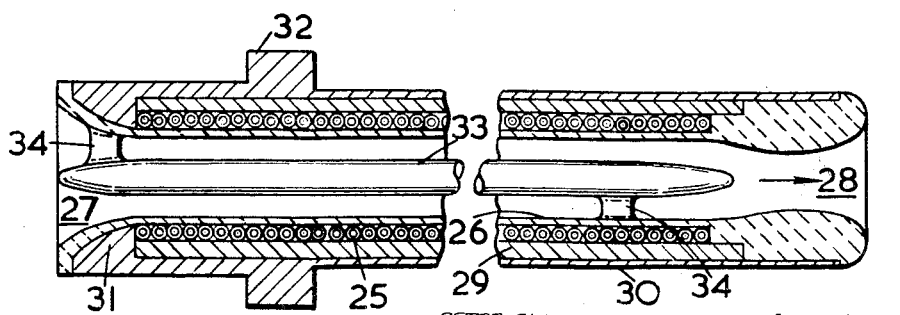
FIG. 7 is a longitudinal cross section of a jet propulsion device.

A further application of the invention in the form of a jet propulsion device is shown in FIG. 7. A solenoid 25 connected either as a loaded transmission line or as a polyphase winding, as in the previous embodiments, is wound on a long refractory tube 26 having an inlet 27 and an outlet 28 shaped for optimum conditions of fluid flow at high velocity. The windings are of copper tube cooled by water circulated therethrough.

The solenoid is enclosed within a sheath 29 of magnetic material and the whole is encased within a tube 30 incorporating thrust flanges 31 and 32. Supported axially within the tube 26 by radial webs 34 in a central core 33 of magnetic material. The travelling electromagnetic wave set up in the solenoid sets up an electromagnetic discharge in the air within the device and electrons are driven down the tube by the wave by the same interaction of electron currents and field components as in the previously described devices.

Momentum is communicated to the air which thus passes through the solenoid at a velocity tending to approach that of the wave.

If W is the power absorbed from the wave and $v$ is the phase velocity of the wave maximum force of reaction on the conductors is given by $$F = \frac{W}{v}$$

If $v = 10^4$ cm./sec. and the power absorbed $2 \times 10^6$ watts (2600 H.P.)

$$F = \frac{2 \times 10^6 \times 10^7}{10^4} \text{ dynes} = 2 \times 10^8 \text{ dynes} = 3000 \text{ lbs. thrust}$$

This application is a division of our application S.N. 241,224, filed August 10, 1951.

We claim:
1. In an electro-magnetic induction device for the conversion of radio frequency electrical energy into direct current electrical energy, the combination comprising,
    (a) a sealed tube,
    (b) a gaseous conducting medium enclosed within the sealed tube,
    (c) an anode and a non-heated cathode disposed within the sealed tube at opposite ends thereof,
    (d) a helix wound around said sealed tube,
    (e) oscillator means having a first and a second output terminal,
    (f) means for connecting said helix across the first and second output terminals of the oscillator means,
    (g) means for connecting a multiplicity of condensers separately from spaced windings of said helix to the second output terminal of the oscillator means whereby radio frequency current fed by the oscillator means to the helix loaded by the condensers generates a travelling electro-magnetic wave with a magnetic field having radial and longitudinal components such that the travelling electro-magnetic wave causes the electrons within said sealed tube to drift towards the anode thereby providing a direct current potential across the anode and cathode and
    (h) passive means connected across the cathode and anode for supplying further electrons to the electron drift and for utilizing the direct current potential therebetween.

2. An electro-magnetic induction device as set forth in claim 1 wherein the conducting medium is mercury vapour.

3. An electro-magnetic induction device as set forth in claim 1 wherein the conducting medium is xenon gas.

References Cited in the file of this patent

UNITED STATES PATENTS

| | | |
|---|---|---|
| 2,096,460 | Llewellyn | Oct. 19, 1937 |
| 2,163,740 | Wales | June 27, 1939 |
| 2,218,725 | Schroeder | Oct. 22, 1940 |
| 2,657,305 | Knol et al. | Oct. 27, 1953 |
| 2,657,314 | Kleen et al. | Oct. 27, 1953 |